No. 784,838. Patented March 14, 1905.

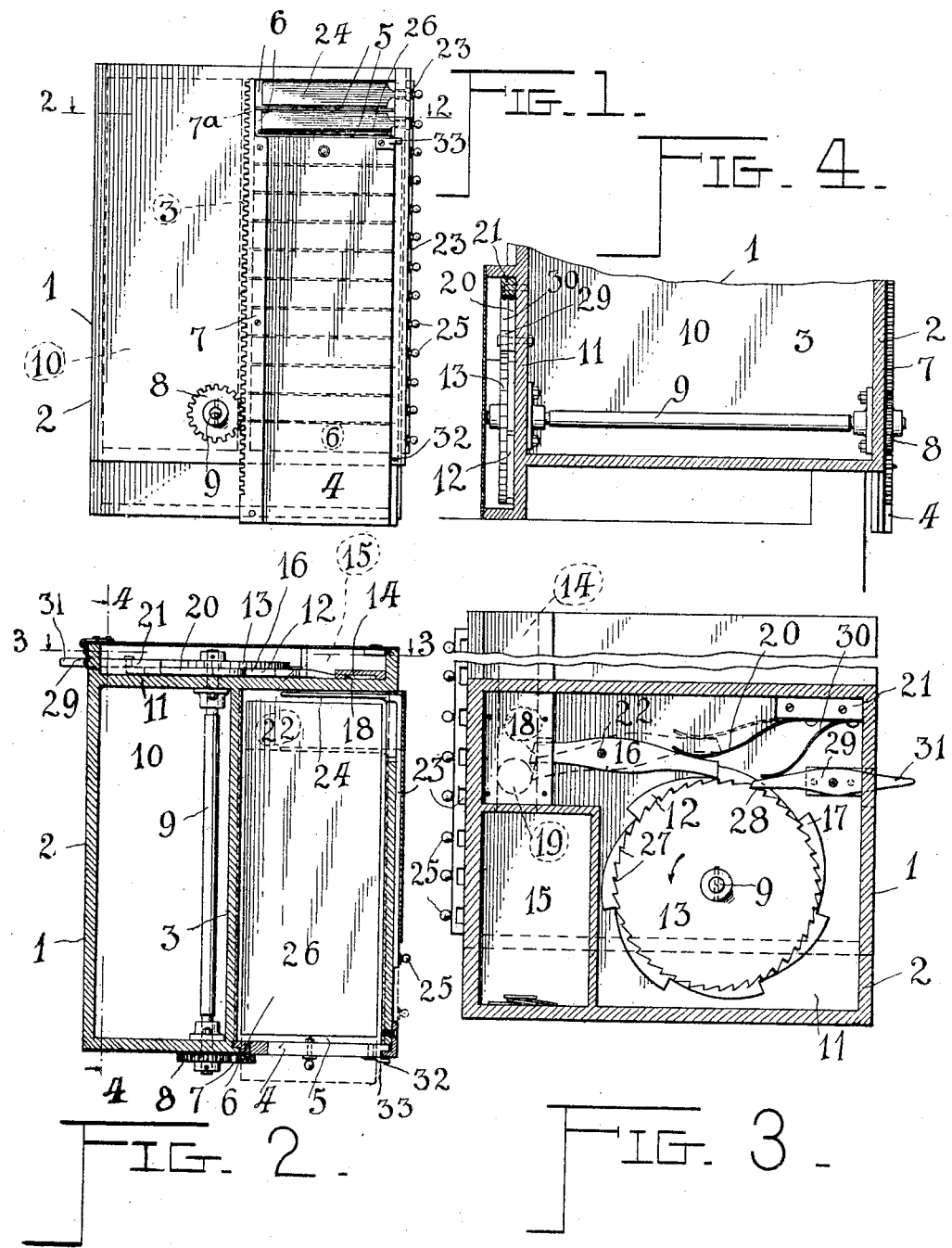

UNITED STATES PATENT OFFICE.

AUSTIN CONWAY, OF SHERBROOKE, CANADA.

VENDING-MACHINE.

SPECIFICATION forming part of Letters Patent No. 784,838, dated March 14, 1905.

Application filed March 3, 1904. Serial No. 196,450.

*To all whom it may concern:*

Be it known that I, AUSTIN CONWAY, a subject of the King of Great Britain, residing at the city of Sherbrooke, county of Sherbrooke, in the Province of Quebec, Canada, have invented certain new and useful Improvements in Vending-Machines; and I do hereby declare that the following is a full, clear, and exact description of the invention, such as will enable others skilled in the art to which it appertains to make and use the same.

This invention relates to new and useful improvements in vending apparatus designed particularly for use in vending articles of current publication, such as newspapers, magazines, periodicals, and the like.

The object of the invention is to provide means whereby a suitable receptacle is provided, which receptacle is capable of holding a greater or less number of the articles or packages to be sold and which may be conveniently operated by the intending purchaser without in any manner calling for the exercise of mechanical knowledge in the operation of the device, the machine being in all particulars as nearly automatic as is possible for the purpose of exposing the article for sale.

A further object of the invention is to provide means whereby when the receptacles containing the vendible commodity have been exposed and the contents extracted therefrom the closure for said receptacle will be locked against unlawful manipulation to cover compartments the contents of which have been disposed of.

To that end my invention is fully disclosed in the accompanying drawings, in which similar numerals of reference indicate corresponding parts in all the views, in which—

Figure 1 is an elevational view of my improved vending apparatus, showing two of the compartments at the upper end thereof exposed. Fig. 2 is a horizontal sectional view taken on the line 2 2 of Fig. 1 looking in the direction indicated by the arrows. Fig. 3 is a vertical sectional view taken on the line 3 3 of Fig. 2; and Fig. 4 is a view partly broken away, which view is taken on the lines 4 4 of Fig. 2.

It is to be understood that the invention is designed to be placed in convenient position where it will be readily accessible to the general public and may be mounted upon suitable retaining means, such as a stand or pedestal having legs or other supporting means, or upon a table or shelf, as indicated diagrammatically in Fig. 4.

The means of mounting the apparatus not entering into the features of invention thereof are not shown in detail.

In the drawings, 1 indicates generally a casing containing the operative features of my device. The casing is preferably composed of the outer wall 2, divided transversely by the wall 3 and having the vertically-slidable gravity shield or door 4. Within the casing 1 are horizontally-disposed shelves 5, (best shown in Fig. 1,) the shelves being spaced at suitable distances apart vertically and superposed one upon the other so as to provide the requisite number of compartments 6, within which may be placed the newspapers, magazines, periodicals, or other commodity intended to be sold.

Upon one edge of the shield 4 is a vertically-disposed rack 7, with teeth projecting horizontally therefrom and adapted to mesh with the pinion 8, the said pinion being keyed upon the shaft 9, which shaft extends from the forward to the rear side, preferably, of the casing 1, though it would be obvious that by the substitution of suitable bevel-gears the said shaft 9 may terminate within the compartment indicated as 10, wherein the operative elements hereinafter described may be placed, if desired. However, as shown, the shaft 9 projects through the wall 11 and has upon its rear end two ratchets 12 and 13, the ratchet 12 being provided with relatively large teeth, an angular shoulder of which projects in one direction, while the member 13 is provided with much smaller teeth, which project in an opposite direction, the function of which ratchets will be hereinafter described.

Suitably disposed in the rear portion of the casing 1 is a coin-slot 14, leading to the coin receptacle or compartment 15. Pivotally connected to the wall 11 and projecting into the coin-slot 14 is a rockable arm 16, (shown in full lines and in dotted lines in Fig. 3,) the inner end—that is, the end projecting toward the direction of the interior of the machine—engaging with one of the teeth 17 incident to the formation of the ratchet 12 and the outer end 18 projecting into the coin-slot 14, whereby the arm 16 is adapted to be rocked by means of a coin, as 19. (Shown in dotted lines in Fig. 3.) Bearing upon the ratchet end of the lever 16 is a spring 20, which is connected at its opposite end with the block 21; the tendency of the said spring being to hold the rockable member 16 normally in engagement with one of the teeth 17 of the disk 12, but the spring 20 is sufficiently flexible to permit a coin, as 19, rocking the arm 16 upon its pivot 22 when desired to actuate the apparatus. The disk 12 being keyed to the shaft 9, it is evident that as soon as the arm 16 is released from its engagement with the tooth, as 17, the shaft 9 is free to rotate. The gear 8 on the opposite end of said shaft meshing with the rack 7 upon the shield 4 will cause the shaft 9 to rotate upon movement of the said shield. Therefore as soon as the disengagement of the arm 16 from its tooth 17 is permitted gravity will project the shield 4 downwardly, and this movement will be continued except as limited by the action of the members 12, 16, and 20, the spring 20 in the meantime bearing upon the inner end of the arm 16 as soon as it has been released from one of the teeth 17 and causing it to become positively engaged with the angular projection of the next tooth 17 of the series on the disk 12.

The disk 12 is of such diameter and the teeth 17 are provided at such distances apart thereon that the space from the angular end of one tooth to the base thereof or the angular end of the next tooth is the exact distance the said disk should rotate to permit the shield 4 to drop a sufficient distance to completely uncover one of the compartments 6, and no more. Therefore as a coin is dropped into the coin-slot 14 the result will be, through the rocking of the arm 16, progression of the disk 12, rotation of the shaft 9, gear 8, and the dropping of the shield 4, that but one compartment will be exposed or uncovered. When any compartment is uncovered by dropping the shield 4 away therefrom, it is evident that, assuming the compartment to be of the proper size and the newspaper or other vendible commodity therein to be of the proper proportion, the contents of said compartment may be readily extracted by the purchaser.

To facilitate the delivery of the newspapers or other articles sold, I have added to the apparatus a longitudinally-slidable rack or ejecting means 23, provided with the angular offset 24, which latter is held normally in the rear of the article to be sold or approximately in contact with the wall 11. Therefore if the newspaper is not readily accessible it is within the province of the purchaser to grasp the handle or knob 25, a plurality of which appear upon the machine, as represented, one for each compartment, and draw the same in the direction toward the purchaser, whereupon the angular projection 24 will project a newspaper, as 26, outwardly from the compartment, as indicated by dotted lines in Fig. 2.

As articles of this class are necessarily exposed to public view and may to some extent attract the attention of malicious persons or it is possible that they may be operated improperly by persons of good intention, it is desirable that the shield 4 may be locked in proper position, so that it may not be caused to return to its uppermost position to cover any of the compartments from which the newspapers have been extracted. For that purpose the ratchet-disk 13 is provided, which ratchet-disk has the teeth 27 adapted to engage the inner angular end portion 28 of the pivoted lever or arm 29, said inner end 28 being normally pressed downwardly by means of the spring 30 bearing thereon and connected at its opposite end with the block 21. As the disk 13 is keyed upon the shaft 9, it is evident that the said disk may not be rotated except in the direction indicated by the arrow, which is the direction for delivery only at such times as the outer end 31 of the lever 29 is depressed, for the purpose of releasing the inner end 28 from engagement with the ratchet-teeth 27 on said disk 13. Therefore it will not be possible, except upon manipulation of the lever 29, to raise the shield 4 to cover compartments from which their contents have been extracted.

It is of course intended that the operative parts of the device shall be protected by suitable shields or covers, which may be of wood, metal, or any suitable material, to prevent unlawful manipulation thereof, and that such covers may have doors or openings therein, which are operated only by the person having the required key or other opening device.

Projecting forwardly from the casing 1 is a pin 32, which is adapted to serve as a stop, with which pin engages an angularly-projecting offset 33, (shown in Figs. 1 and 2,) whereby the shield 4 will be prevented from falling any lower than is necessary to expose the lowermost compartment 6.

As shown in Fig. 1, the rack 7 has an upwardly-projecting portion $7^a$, which extends above the shield 4, so as to permit the said shield to drop to its lowermost position and still retain the rack in engagement with the pinion 8, thereby utilizing to the fullest extent the available capacity of the apparatus.

While I have shown in the accompanying drawings the preferred form of my invention, it will be understood that I do not limit myself to the precise form shown, for many of the details may be changed in form or position without affecting the operativeness or utility of my invention, and I therefore reserve the right to make all such modifications as are included within the scope of the following claims or of mechanical equivalents to the structures set forth.

Having described my invention, what I claim as new, and desire to secure by Letters Patent, is—

1. In a vending-machine, the combination with a casing having transverse compartments, of a slidable gravity cover for the said compartments, means retaining the cover in predetermined positions, releasing means whereby said cover is caused to expose said compartments in single series, and means for preventing return movement of said cover, and an ejector for each compartment, the same comprising a slidable rod with angular offset with the offset arranged to engage the rear of a magazine.

2. In a vending-machine, the combination of a casing having transverse compartments, a slidable gravity cover for said compartments, a rack carried at one edge of said cover, a pinion meshing with said rack, a shaft carrying said pinion, a ratchet fast upon said shaft and having its teeth arranged a distance apart corresponding to the distance between the said compartments, a second ratchet on said shaft having its teeth oppositely extending, a spring-actuated lever engaging the last-named ratchet, and a rocking arm having one end engaging the other ratchet and its other end extended to be actuated by contact with an object moving over the same.

In witness whereof I have hereunto set my hand in the presence of two witnesses.

AUSTIN CONWAY.

Witnesses:
HARLEY H. CAMERON,
J. O. ARCHAMBAULT.